Patented Oct. 16, 1945

2,386,783

UNITED STATES PATENT OFFICE 2,386,783

DERIVATIVES OF β-(3-HYDROXYCYCLO-PENTANOPOLYHYDROPHENANTHRENE)-Δ$^{α,β}$-BUTYROLACTONES

Robert C. Elderfield, Hastings on Hudson, and Frederick C. Uhle, New York, N. Y., assignors to Eli Lilly and Company, Indianapolis, Ind., a corporation of Indiana No Drawing. Application October 23, 1942, Serial No. 463,122

18 Claims. (Cl. 260—210)

This invention relates to aldose derivatives and acylated aldose derivatives of β-(3-hydroxycyclopentanopolyhydrophenanthrene) - Δ$^{α,β}$ - butyrolactones.

The natural cardiac drugs with the exception of the toad venoms and a few members of the group which appear to be true alkaloids occur as glycosides. Until comparatively recently the view was fairly widely held that the function of the carbohydrate moiety was the increase the solubility of the aglycone in the aqueous body fluids and, in the case of polysaccharides of the aglycones, to provide a larger molecule, the speed of absorption of which into the body tissues would be slower and hence tend to promote a cardiotonic effect of longer duration. Recently, however, there is evidence to demonstrate that, while the aglycone portion of the glycoside molecule undoubtedly plays a dominant role in determining the qualitative action of the glycosides, the carbohydrate portion is not without influence on the quantitative action of the drugs. It has therefore been established that the carbohydrate moiety of the cardiac-type drugs is an important function in producing the effects desired by these drugs.

The compositions of this invention are glycosides, but, unlike the natural cardiac drugs, the compositions of this invention have an aldose residue in which the hydroxyl groups on the second and third carbon atoms of the aldose residue are in a trans relation to each other and in which the aldose nucleus is linked through a β-pyranoside ring to the 3 carbon atom of the cyclopentanopolyhydrophenanthrene nucleus. The compositions of this invention may be represented by the following formula:

(1) 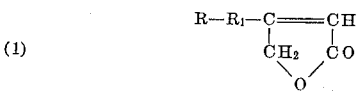

in which R is an aldose residue or an acylated aldose residue having the acylated groups on the second and third carbon atoms in a trans relation to each other, and R$_1$ is a cyclopentanopolyhydrophenanthrene nucleus to which the aldose residue is connected through a β-pyranoside ring to the 3 carbon atom of the nucleus through an oxygen atom and in which the β-carbon atom of the lactone ring is connected directly to the 17 carbon atom of the nucleus. Desirably, the cyclopentanopolyhydrophenanthrene nucleus contains a tertiary hydroxyl group in the 14 position. The term cyclopentanopolyhydrophenanthrene throughout the description and claims is used in generic sense and that cyclopentanopolyhydrophenanthrene may contain one or a plurality of the same or different substituents. The term β - (3 - hydroxycyclopentanopolyhydrophenanthrene)-Δ$^{α,β}$-butyrolactone is also used in a generic sense and the cyclopentanopolyhydrophenanthrene nucleus of that butyrolactone may contain one or a plurality of the same or different substituents.

The compositions of this invention are prepared as follows:

Approximately 1 molecular equivalent of a β - (3 - hydroxycyclopentanopolyhydrophenanthrene)-Δ$^{α,β}$-butyrolactone, 1¼ molecular equivalents of dry silver carbonate or lead carbonate, and a quantity of a dehydrating agent, such as anhydrous magnesium sulfate dissolved in an inert solvent, such as dioxane, are agitated in a container protected from the admission of moisture until the ingredients are thoroughly mixed. To this mixture is added slowly a solution of approximately 2 molecular equivalents of an acylhalo-α-aldose selected from the class consisting of acylbromo-α-aldoses and acylchloro-α-aldoses dissolved in a suitable inert solvent, such as dioxane. The acylhalo-α-aldose may, for example, be derived from a monosaccharide, disaccharide, trisaccharide, or tetrasaccharide. In the formation of some of the compositions of this invention, desirably a catalyst, such as iodine, is employed. After permitting the reaction mixture to remain at room temperatures (about 20° C.) for a period of several hours, the silver or lead salts and dehydrating agent are removed by any suitable means, such as filtration. The solution, which contains the acylated aldose derivative of the β - (3 - hydroxycyclopentanopolyhydrophenanthrene)-Δ$^{α,β}$-butyrolactone, is concentrated, desirably under reduced pressure. The reaction which takes place when the acylhalo-α-aldose is derived from a monosaccharide may be represented by the following equation:

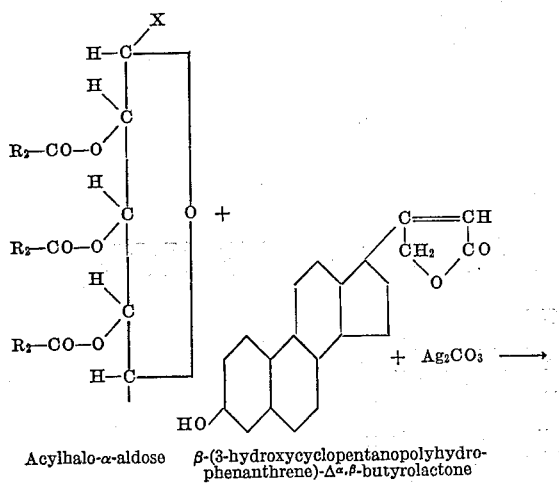

Acylhalo-α-aldose   β-(3-hydroxycyclopentanopolyhydrophenanthrene)-Δ^{α,β}-butyrolactone (2)

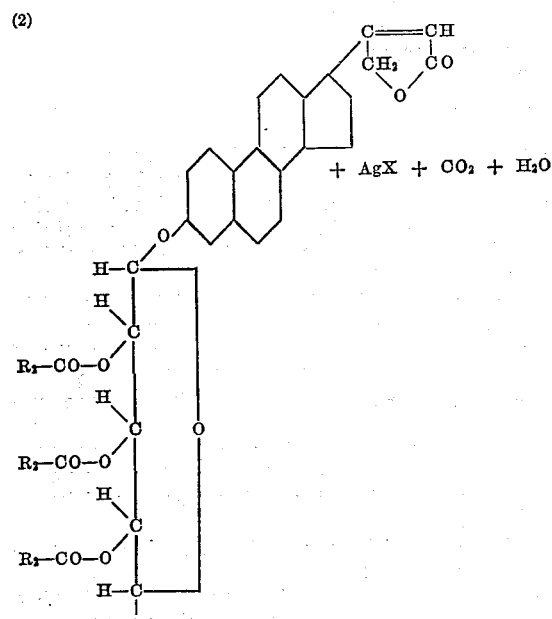

in which X is bromine or chlorine and $R_2$ is a hydrocarbon group, desirably an alkyl group having not more than four carbon atoms and preferably the methyl group. However, the hydrocarbon group may be a cyclic hydrocarbon group, such as phenyl. In this equation the pertinent portions of the acylhalo-α-aldose and the acyl-α-aldose residue are given. The acylhalo-α-aldose treated may contain any number of carbon atoms in addition to those shown in pertinent portions of the acylhalo-α-aldose or acyl-α-aldose residue. For example, the starting composition may be an acylchloro-α-hexose, or an acylchloro-α-hexose-hexose. The β-(3-hydroxycyclopentanopolyhydrophenanthrene)-Δ^{α,β}-butyrolactone nucleus is also merely given in skeleton form. It may contain varied substituents, such as a hydroxyl group in the 14 position and methyl groups in the 10 and 13 positions, or an aldehyde group in the 10 position and a methyl group in the 13 position of that nucleus, or one or more hydroxyl groups in other positions.

The acylated aldose derivative of the β-(3-hydroxycyclopentanopolyhydrophenanthrene)-Δ^{α,β}-butyrolactone is deacylated to form the corresponding aldose derivative of the β-(3-hydroxycyclopentanopolyhydrophenanthrene)-Δ^{α,β}-butyrolactone. This deacylation is most conveniently achieved by adding to a molecular equivalent of the acylated aldose derivative of the β-(3-hydroxycyclopentanopolyhydrophenanthrene)-Δ^{α,β}-butyrolactone dissolved in a lower alkyl alcohol, such as methanol, a quantity of a metal alkoxide also dissolved in a lower alkyl alcohol. Desirably, the metal alkoxide is barium alkoxide, and preferably barium methoxide, since the barium can be easily removed from the reaction mixture by precipitation with sulfuric acid. The reaction mixture is permitted to stand for several hours during which time the acylated aldose derivative of the β-(3-hydroxycyclopentanopolyhydrophenanthrene)-Δ^{α,β}-butyrolactone is deacylated to form the corresponding aldose derivative. If a barium alkoxide is used in the deacylation instead of precipitation with sulfuric acid, the barium may be removed by passing carbon dioxide through the reaction mixture, followed by subsequent warming to convert the barium bicarbonate initially formed to barium carbonate and finally by separating the insoluble barium carbonate from the reaction mixture.

The reaction which takes place during this deacylation when the acylated aldose derivative is derived from a monosaccharide may be represented by the following equation:

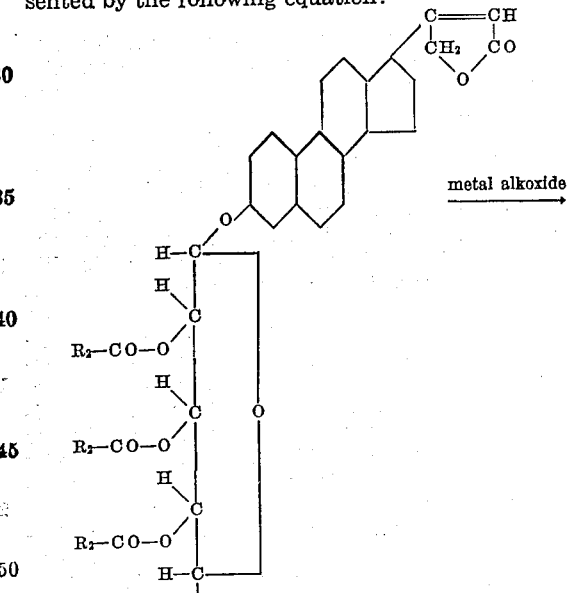

(3)

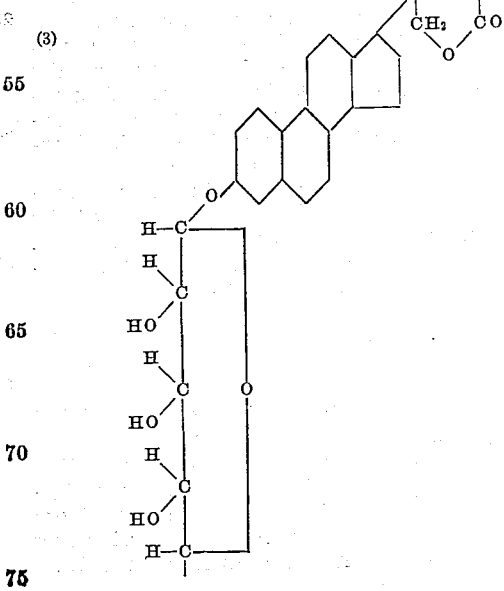

The metal compounds in the reaction mixture may be moved by any suitable means. If a barium alkoxide is used, it may be removed after quantitative precipitation with sulfuric acid by filtration of the barium sulfate.

The resulting aldose derivative of the β-(3-hydroxycyclo-pentanopolyhydrophenanthrene)-$\Delta^{\alpha,\beta}$-butyrolactone may be purified by any suitable means, such as crystallization from solvents. For this purpose, ethyl acetate saturated with water has been found especially satisfactory with certain derivatives.

The β-(3-hydroxycyclopentanopolyhydrophenanthrene)-$\Delta^{\alpha,\beta}$-butyrolactone employed as the starting material may have substituents in the cyclopentanopolyhydrophenanthrene nucleus and may also contain unsaturated bonds in the nucleus itself. For example, the aldose and acyl aldose derivatives of the following compositions having the substituents in the positions indicated on that nucleus are within the scope of this invention:

| Name | Substituents |||||| 
|---|---|---|---|---|---|---|
| | Position 3 | Position 5 | Position 10 | Position 11 | Position 14 | Position 16 |
| Peripiplogenin | OH | OH | CH₃ | H | OH | H |
| Digitoxigenin | OH | H | CH₃ | H | OH | H |
| Gitoxigenin | OH | H | CH₃ | H | OH | OH |
| Digoxigenin | OH | H | CH₃ | OH (12) | OH | H |
| Strophanthidin | OH | OH | CHO | H | OH | H |
| Sarmentogenin | OH | H | CH₃ | OH | OH | H |
| Monoanhydrothevetigenin | OH | H | CH₃ | H | ------ | H |
| α- and β-monoanhydrouzarigenin | OH | H | CH₃ | H | ------ | H |

The β-aldose or acyl-β-aldose residue of the compositions of this invention may be derivatives of any β-aldose having a β-pyranoside ring having the substituents in the second and third carbon atoms in the trans relation to each other. For example, the residue may be a derivative of the following α-aldoses:

Monosaccharides

*Pentoses*

β-d-arabinose
β-l-arabinose
β-d-xylose
β-l-xylose

*Hexoses*

β-d-glucose
β-l-glucose
β-d-galactose
β-l-galactose
β-d-altrose
β-l-altrose
β-d-idose
β-l-idose

*Methylhexoses*

β-d-glucomethylose
β-l-glucomethylose
β-d-galactomethylose
β-l-galactomethylose
β-d-altromethylose
β-l-altromethylose

*Heptoses*

β-d-glucoheptose
β-l-glucoheptose

*Methylheptoses*

β-d-glucoheptomethylose
β-l-glucoheptomethylose

Disaccharides

Lactose
Cellobiose
Gentiobiose

Typical examples of the method of preparing the compositions of this invention are as follows:

All melting points noted in the examples are corrected for stem exposure.

*Example 1.*—The preparation of strophanthidin tetraacetyl-β-d-glucoside is given as typical of the general procedure. The other acylated glycosides in the typical examples are prepared by this general method, with the variations noted for the individual examples.

A mixture of 4 g. (.0097 mol) of strophanthidin, 3.5 g. (.0127 mol) of dry silver carbonate, 6 g. of anhydrous magnesium sulfate and 40 cc. of dioxane (which has been refluxed over and distilled from sodium) is stirred for one hour in a three-necked flask equipped with a dropping funnel. All solutions, as well as the reaction mixture, are carefully protected from moisture by calcium chloride tubes. One half gram of iodine is then added and a solution of 8 g. (.0193 mol) of acetobromoglucose in 20 cc. of dry dioxane is added dropwise over a period of an hour. The mixture is allowed to react at room temperature for 20 hours. During this time, strophanthidin-tetraacetyl-β-d-glucoside is formed. The silver salts and magnesium sulfate are filtered off and the filtrate is concentrated under reduced pressure to a viscous straw-colored oil. The oil is exhaustively stirred with several portions of anhydrous ether until it has completely solidified. When petroleum ether is added to the combined ether washings, an additional amount of solid material is obtained which may be combined with the main crop. The crude strophanthidin-tetraacetyl-β-d-glucoside is crystallized from a mixture of alcohol and water. To obtain a purer product it may be recrystallized. The strophanthidin-tetraacetyl-β-d-glucoside forms long needles which tend to felt when dry. The melting point varies with the rate of heating, but the compound ordinarily begins to soften at about 165° C. and melts with decomposition between about 240° C. and 250° C. For analysis the substance is dried over calcium chloride at 75° C. and 10 mm. Analysis reveals 60.3 percent carbon and 6.7 percent hydrogen compared with theoretical values of 60.5 percent carbon and 6.9 percent hydrogen. Its optical activity is:

$$[\alpha]_D^{27} = +24° \quad (c=.978 \text{ in chloroform})$$

*Example 2.*—Strophanthidin-tetraacetyl-β-d-galactoside is prepared exactly as is the glucoside described in Example 1, except that instead of using 8 g. of acetobromoglucose, 8 g. of acetobromogalactose is employed. The strophanthidin tetraacetyl-β-d-galactoside crystallizes from dilute alcohol as prismatic needles which sinter at about 230° C. and melts with decomposition at about 236°–237° C. It contains 0.5 mol of water of crystallization. For analysis it is dried over calcium chloride at 75° C. and 10 mm. Analysis reveals 59.7 percent carbon and 6.7 percent hydrogen compared with theoretical values of 59.7 percent carbon and 6.9 percent hydrogen. Its optical activity is:

$$[\alpha]_D^{28} = +16° \quad (c=1.756 \text{ in chloroform})$$

*Example 3.*—Strophanthidin-triacetyl-β-d-xyloside is prepared exactly as is the glucoside in Example 1, except that instead of using 8 g. of acetobromoglucose, 7.5 g. of acetobromoxylose is employed. The strophanthidine-triacetyl-β-d-xyloside crystallizes from dilute alcohol as long needles which contain two mols of water of crystallization and melts with decomposition at 240°–250° C. after preliminary sintering. For analysis the substance is dried at 75° C. and 10 mm. over calcium chloride. Analyses reveals 58.4 percent carbon and 7.5 percent hydrogen compared with theoretical values of 58.4 percent carbon and 7.2 percent hydrogen. Its optical activity is:

$$[\alpha]_D^{27} = -10° \quad (c = .676 \text{ in chloroform})$$

*Example 4.*—Strophanthidin-triacetyl-β-l-arabinoside is prepared exactly as is the glucoside described in Example 1, except that no iodine is used to catalyze the reaction, and instead of using 8 g. of acetobromoglucose 7.5 g. of acetobromoarabinose is employed. The strophanthidin-triacetyl-β-l-arabinoside crystallizes from dilute alcohol as needles, the melting point of which varies greatly with the rate of heating. Ordinarily it begins to sinter at about 155° C. and melts with effervescence and decomposition at about 200° C. Attempts to improve the yield by the use of iodine result in the formation of brown oily products which cannot be obtained in crystalline form. For analysis it is dried at 75° C. and 10 mm. over calcium chloride. Analysis reveals 61.3 percent carbon and 7.2 percent hydrogen compared with theoretical values of 61.6 percent carbon and 7.0 percent hydrogen. Its optical activity is:

$$[\alpha]_D^{28} = +20° \quad (c = 1.600 \text{ in chloroform})$$

*Example 5.*—Strophanthidin-β-d-glucoside is prepared as follows:

To a solution of 0.5 g. of strophanthidin-tetraacetyl-β-d-glucoside in 75 cc. of absolute methanol is added 1 cc. of approximately 0.5 N barium methylate solution in absolute methanol. The solution is allowed to stand for 8 hours in the refrigerator maintained at about 5° C. During this time the strophanthidin-triacetyl-β-d-glucoside is deacetylated to form strophanthidin-β-d-glucoside. The barium is quantitatively precipitated with dilute sulfuric acid and the mixture is filtered. The filtrate from the barium sulfate is concentrated under reduced pressure (15 mm.), leaving an oily residue which is very soluble in water and sparingly soluble in absolute alcohol and ethyl acetate. Repeated attempts to crystallize the glucoside from the ordinary solvents yield it only in the amorphous state. It is obtained crystalline from ethyl acetate which has been previously saturated with water. Once crystalline, the glucoside may be conveniently recrystallized by dissolving it in 95 per cent ethyl alcohol and adding ether to the solution until a slight turbidity appears. Strophanthidin-β-d-glucoside separates as fine needles which contain 0.5 mol of water of crystallization and melt with decomposition at about 234°–236° C. after sintering at about 228° C. For analysis it is dried at 60° C. and 10 mm. over calcium chloride for 8 hours. Analysis reveals 60.3 percent carbon and 7.8 percent hydrogen compared with theoretical values of 60.5 percent carbon and 7.5 percent hydrogen. Its optical activity is:

$$[\alpha]_D^{30} = +21° \quad (c = .620 \text{ in water})$$

*Example 6.*—Strophanthidin-β-d-xyloside is prepared exactly as the glucoside described in Example 5, except that instead of using 0.5 g. of strophanthidin-tetraacetyl-β-d-glucoside, 0.5 g. of strophanthidin-triacetyl-β-d-xyloside is employed. The strophanthidin-β-d-xyloside crystallizes as needles which contain 2.5 mols of water of crystallization and melts with decomposition at about 152°–154° C. For analysis it is dried at 75° C. and 10 mm. over calcium chloride. Analysis reveals 58.0 percent carbon and 7.8 percent hydrogen compared with theoretical values of 57.8 percent carbon and 7.8 percent hydrogen. The optical activity is as follows:

$$[\alpha]_D^{29} = +7° \quad (c = .366 \text{ in 95 percent alcohol})$$

*Example 7.*—Strophanthidin-β-l-arabinoside is prepared exactly as is the glucoside described in Example 5, except that instead of using 0.5 g. of strophanthidin-tetraacetyl-β-d-glucoside, 0.5 g. of strophanthidin-triacetyl-β-l-arabinoside is employed and the resulting strophanthidin-β-l-arabinoside is crystallized directly without treatment with wet ethyl acetate by dissolving it in alcohol, adding water to the solution and then evaporating most of the alcohol. The strophanthidin-β-l-arabinoside crystallizes in long needles containing 0.5 mol of water of crystallization. The melting point varies with the rate of heating, but ordinarily the substance melts with decomposition and effervescence at about 210° C. after preliminary sintering. For analysis it is dried at 75° C. and 10 mm. over calcium chloride. Analysis reveals 61.6 percent carbon and 7.8 percent hydrogen compared with theoretical values of 61.6 percent carbon and 7.6 percent hydrogen. The optical activity is as follows:

$$[\alpha]_D^{30} = +31° \quad (c = 1.100 \text{ in 95 percent alcohol})$$

The acetylarabinoside may also be deacetylated with methyl alcoholic ammonia as follows:

To a solution of 100 mg. of the strophanthidin-triacetyl-β-l-arabinoside in 20 cc. of absolute methanol is added 100 cc. of an approximately 15 percent solution of dry ammonia in absolute methanol. The solution is allowed to stand in the refrigerator maintained at about 5° C. for 24 hours. It is then concentrated under reduced pressure and the residue extracted with dry ethylacetate. The product remaining from the extraction crystallizes from dilute alcohol when seeded with the strophanthidin-β-l-arabinoside obtained by the use of barium methylate.

*Example 8.*—Periplogenin tetraacetyl β-d-glucoside is prepared as follows:

A mixture of 1 g. (0.0026 mol) of periplogenin, 0.8 g. (0.0029 mol) of dry silver carbonate, 2 g. of anhydrous magnesium sulfate, and 60 cc. of dioxane is stirred at room temperature for one hour. A solution of 2.2 g. (0.0054 mol) of acetobromoglucose in 15 cc. of dioxane is then added from a dropping funnel over a period of one half hour. After the mixture has been allowed to react at room temperature for 20 hours, the silver salts and magnesium sulfate are filtered off and the filtrate concentrated under diminished pressure to an oil. This oil is almost completely soluble in ether. Petroleum ether (Skellysolve B) is added to this ether solution, and the oily precipitate which forms is crystallized from a mixture of alcohol and water. The compound crystallizes as fine needles. Analysis reveals 59.4 percent carbon and 7.4 percent hydrogen compared with theoretical values of 59.4 percent carbon and 7.4 percent hydrogen.

*Example 9.*—Periplogenin β-d-glucoside is prepared as follows:

To a solution of 0.250 g. of periplogenin tetraacetyl β-d-glucoside in 75 cc. of absolute methanol is added 1 cc. of approximately 0.5 N barium methylate solution in absolute methanol. After the solution has been allowed to stand for 4 hours in the refrigerator (temperature about 5° C.), the barium is quantitatively precipitated with dilute sulfuric acid. The filtrate from the barium sulfate is concentrated under diminished pressure, leaving an oily residue. This oil is crystallized from ethyl acetate which has been previously saturated with water. The product is recrystallized by adding ether to its solution in 95 percent alcohol. It crystallizes as fine needles.

*Example 10.*—Strophanthidin-tetraacetyl-β-d-glucoside is prepared by utilizing acetochloroglucose as follows:

A mixture of 4 g. (.0097 mol) of strophanthidin, 3.5 g. (.0127 mol) of dry silver carbonate, 6 g. of anhydrous magnesium sulfate, and 40 cc. of dioxane is stirred at room temperature for one hour. One half gram of iodine is then added, and a solution of 7.1 g. (.0194 mol) of acetochloroglucose in dioxane is added from a dropping funnel over a period of one hour. After the mixture has been allowed to react at room temperature for 48 hours, the insoluble components are filtered off and the dioxane is evaporated under diminished pressure. The viscous oil which remains is stirred with several portions of anhydrous ether until it has almost completely solidified. This crude acetylglucoside is crystallized from a mixture of alcohol and water.

What is claimed is:

1. An acylated glycoside of a β-(3-hydroxycyclopentanopolyhydrophenanthrene)-$\Delta^{\alpha,\beta}$-butyrolactone containing an aldose residue in which said aldose residue is completely acylated and is glycosidally linked to the 3 carbon atom of the cyclopentanopolyhydrophenanthrene nucleus.

2. The method of preparing a glycoside of a β - (3 - hydroxycyclopentanopolyhydrophenanthrene)-$\Delta^{\alpha,\beta}$-butyrolactone which comprises reacting, in the presence of a dehydrating agent, an acylhalo-α-aldose selected from the class consisting of acylbromo-α-aldoses and acylchloro-α-aldoses with a β-(3-hydroxycyclopentanopolyhydrophenanthrene)-$\Delta^{\alpha,\beta}$-butyrolactone and deacylating the resulting product.

3. The method of producing a glycoside of a β - (3 - hydroxycyclopentanopolyhydrophenanthrene)-$\Delta^{\alpha,\beta}$-butyrolactone in accordance with claim 2, in which the aldose skeleton of the acylhalo-α-aldose has 5 carbon atoms.

4. The method of producing a glycoside of a β - (3 - hydroxycyclopentanopolyhydrophenanthrene)-$\Delta^{\alpha,\beta}$-butyrolactone in accordance with claim 2, in which the aldose skeleton of the acylhalo-α-aldose has 6 carbon atoms.

5. The method of producing a glycoside of a β - (3 - hydroxycyclopentanopolyhydrophenanthrene)-$\Delta^{\alpha,\beta}$-butyrolactone in accordance with claim 2, in which the aldose skeleton of the acylhalo-α-aldose has 12 carbon atoms.

6. The method of producing an acylated glycoside of a β - (3 - hydroxycyclopentanopolyhydrophenanthrene) - $\Delta^{\alpha,\beta}$ - butyrolactone which comprises reacting, in the presence of a dehydrating agent, an acylhalo-α-aldose selected from the class consisting of acylbromo-α-aldoses and acylchloro-α-aldoses with a β-(3-hydroxycyclopentanopolyhydrophenanthrene)-$\Delta^{\alpha,\beta}$-butyrolactone.

7. The method of producing a glycoside of a β - (3 - hydroxycyclopentanopolyhydrophenanthrene)-$\Delta^{\alpha,\beta}$-butyrolactone which comprises deacylating an acylated aldose derivative of a β - (3 - hydroxycyclopentanopolyhydrophenanthrene)-$\Delta^{\alpha,\beta}$-butyrolactone.

8. The method of preparing a glycoside of a β - (3 - hydroxycyclopentanopolyhydrophenanthrene)-$\Delta^{\alpha,\beta}$-butyrolactone, which comprises reacting, in the presence of anhydrous magnesium sulfate, an acylhalo-α-aldose selected from the class consisting of acylbromo-α-aldoses and acylchloro-α-aldoses with a β-(3-hydroxycyclopentanopolyhydrophenanthrene) - $\Delta^{\alpha,\beta}$ - butyrolactone and deacylating the resulting product.

9. A glycoside of a β-(3-hydroxycyclopentanopolyhydrophenanthrene)-$\Delta^{\alpha,\beta}$-butyrolactone having an aldose residue containing a β-pyranoside ring in which the substituents on the second and third carbon atoms are in a trans relation to each other, the 3 carbon atom of the cyclopentanopolyhydrophenanthrene nucleus being linked glycosidally directly to said β-pyranoside ring.

10. A glycoside of a β-(3-hydroxycyclopentanopolyhydrophenanthrene)-$\Delta^{\alpha,\beta}$-butyrolactone in accordance with claim 9, in which the aldose residue has 5 carbon atoms.

11. A glycoside of a β-(3-hydroxycyclopentanopolyhydrophenanthrene)-$\Delta^{\alpha,\beta}$-butyrolactone in accordance with claim 9, in which the aldose residue has 6 carbon atoms.

12. A glycoside of a β-(3-hydroxycyclopentanopolyhydrophenanthrene)-$\Delta^{\alpha,\beta}$-butyrolactone in accordance with claim 9, in which the aldose residue has 12 carbon atoms.

13. An acylated glycoside of a β-(3-hydroxycyclopentanopolyhydrophenanthrene) - $\Delta^{\alpha,\beta}$ - butyrolactone having an aldose residue containing a β-pyranoside ring in which the substituents on the second and third carbon atoms are in a trans relation to each other, the 3 carbon atom of the cyclopentanopolyhydrophenanthrene nucleus being linked glycosidally directly to said β-pyranoside ring.

14. An acylated glycoside of a β-(3-hydroxycyclopentanopolyhydrophenanthrene) - $\Delta^{\alpha,\beta}$ - butyrolactone in accordance with claim 13, in which the skeleton of the aldose residue has 5 carbon atoms.

15. An acylated glycoside of a β-(3-hydroxycyclopentanopolyhydrophenanthrene) - $\Delta^{\alpha,\beta}$ - butyrolactone in accordance with claim 13, in which the skeleton of the aldose residue has 6 carbon atoms.

16. An acylated glycoside of a β-(3-hydroxycyclopentanopolyhydrophenanthrene) - $\Delta^{\alpha,\beta}$ - butyrolactone in accordance with claim 13, in which the skeleton of the aldose residue has 12 carbon atoms.

17. A glycoside of a β-(3,14-dihydroxycyclopentanopolyhydrophenanthrene)-$\Delta^{\alpha,\beta}$-butyrolactone having an aldose residue containing a β-pyranoside ring in which the substituents on the second and third carbon atoms are in a trans relation to each other, the 3 carbon atom of the cyclopentanopolyhydrophenanthrene nucleus being linked glycosidally directly to said β-pyranoside ring.

18. An acylated glycoside of a β-(3,14-dihydroxycyclopentanopolyhydrophenanthrene)-$\Delta^{\alpha,\beta}$-butyrolactone having an aldose residue containing a β-pyranoside ring in which the substituents on the second and third carbon atoms are in a trans relation to each other and in which the aldose residue is completely acylated, the 3 carbon atom of the cyclopentanopolyhydrophenanthrene nucleus being linked glycosidally to said β-pyranoside ring.

ROBERT C. ELDERFIELD.
FREDERICK C. UHLE.